(12) United States Patent
Hancock et al.

(10) Patent No.: US 8,025,423 B2
(45) Date of Patent: Sep. 27, 2011

(54) LED LIGHTING SYSTEM FOR RETROFITTING AN AIRCRAFT CABIN FLUORESCENT LIGHTING SYSTEM

(75) Inventors: Gary Hancock, Centereach, NY (US); Eric Johannessen, Patchogue, NY (US)

(73) Assignee: B/E Aerospace, Inc., Wellington, FL (US)

( * ) Notice: Subject to any disclaimer, the term of this patent is extended or adjusted under 35 U.S.C. 154(b) by 508 days.

(21) Appl. No.: 12/101,377

(22) Filed: Apr. 11, 2008

(65) Prior Publication Data
US 2008/0253122 A1 Oct. 16, 2008

Related U.S. Application Data

(60) Provisional application No. 60/911,659, filed on Apr. 13, 2007.

(51) Int. Cl.
*F21V 33/00* (2006.01)

(52) U.S. Cl. ............. 362/249.02; 362/260; 362/217.01; 362/219

(58) Field of Classification Search ............. 362/217.01, 362/217.08, 219, 225, 240, 249.01, 249.02, 362/249.05, 249.06, 260, 276, 362, 470, 362/471, 478, 479, 488, 490, 545, 555, 647, 362/800
See application file for complete search history.

(56) References Cited

U.S. PATENT DOCUMENTS

| | | | |
|---|---|---|---|
| 6,388,393 B1 | 5/2002 | Illingworth | |
| 6,739,734 B1 | 5/2004 | Hulgan | |
| 6,860,628 B2 | 3/2005 | Robertson et al. | |
| 7,053,557 B2 | 5/2006 | Cross et al. | |
| 7,114,830 B2 | 10/2006 | Robertson et al. | |
| 7,178,941 B2 * | 2/2007 | Roberge et al. | 362/225 |
| 2005/0128751 A1 | 6/2005 | Roberge et al. | |
| 2006/0002110 A1 | 1/2006 | Dowling et al. | |
| 2006/0193131 A1 * | 8/2006 | McGrath et al. | 362/227 |
| 2006/0221606 A1 | 10/2006 | Dowling | |
| 2007/0183156 A1 | 8/2007 | Shan | |
| 2007/0223225 A1 * | 9/2007 | Eiich et al. | 362/260 |
| 2007/0242466 A1 | 10/2007 | Wu et al. | |

* cited by examiner

*Primary Examiner* — Hargobind Sawhney
(74) *Attorney, Agent, or Firm* — Drinker Biddle & Reath LLP

(57) ABSTRACT

A system and method are provided for retrofitting a fluorescent lighting system, for example a passenger cabin fluorescent lighting system on a vehicle such as an aircraft. The present system may include at least one LED lighting unit for replacing, in situ, at least one fluorescent light of the fluorescent lighting system, and a control module for replacing, in situ, at least one ballast-type unit of the fluorescent lighting system that illuminates the at least one fluorescent light. The present system may further include a master control module, which may replace, in situ, an inverter of the fluorescent lighting system. The present method may include steps of: replacing at least one fluorescent light, in situ, with at least one LED lighting unit; and replacing at least one ballast-type unit, in situ, with at least one control module configured to control illumination of the LED lighting unit.

4 Claims, 10 Drawing Sheets

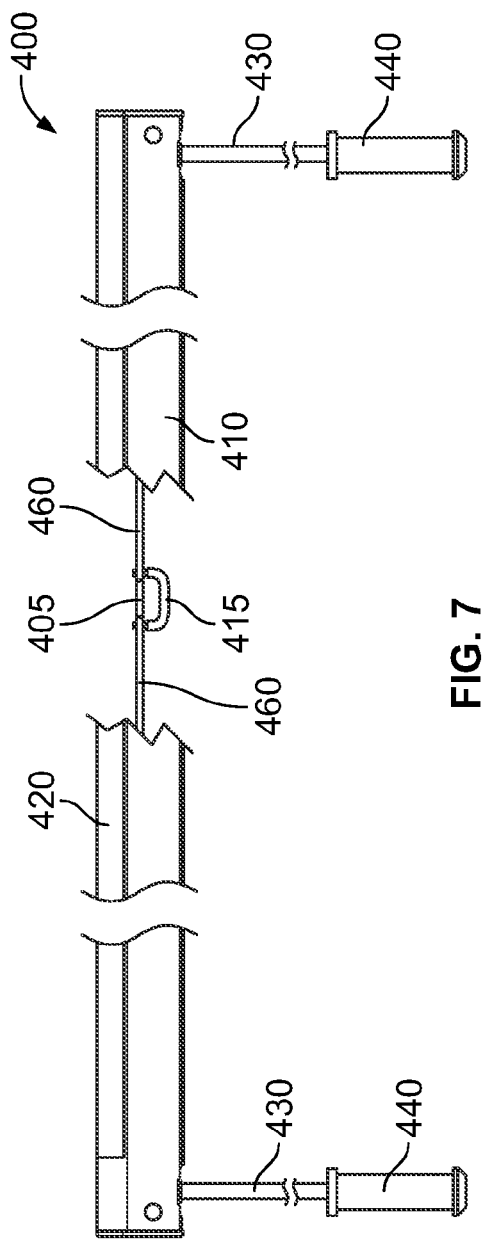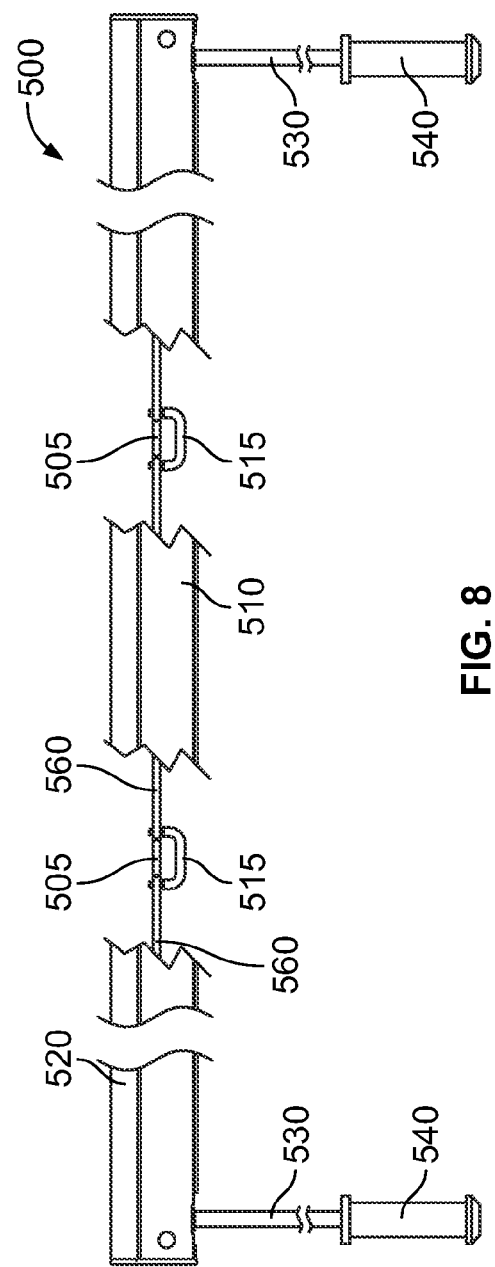
FIG. 7
FIG. 8

LED LIGHTING SYSTEM FOR RETROFITTING AN AIRCRAFT CABIN FLUORESCENT LIGHTING SYSTEM

CROSS-REFERENCE TO RELATED PATENT APPLICATIONS

This patent application claims the benefit of U.S. Provisional Patent Application No. 60/911,659, filed Apr. 13, 2007, the disclosure of which is incorporated herein in its entirety.

FIELD OF THE INVENTION

This invention pertains generally to lighting systems. More particularly, this invention relates to an LED lighting system that is configured to retrofit an aircraft cabin fluorescent lighting system in a plug-and-play manner.

BACKGROUND OF THE INVENTION

Fluorescent lighting fixtures have been employed ubiquitously for the past several decades, in residences, offices, institutional, commercial, industrial, and a host of other environments, as energy-efficient alternatives to incandescent and other types of lighting fixtures that use less efficient light sources. Fluorescent light sources are significantly more efficient than incandescent light sources of an equivalent brightness, because more of the energy consumed by a fluorescent light source is converted to usable light and less is converted to heat (allowing fluorescent lamps to operate at cooler temperatures than incandescent and other light sources). In particular, an incandescent lamp may convert only approximately 10% of its power consumption into visible light, while a fluorescent lamp that produces as much useful visible light energy may require only one-third to one-quarter as much power. Furthermore, a fluorescent light source typically lasts between ten and twenty times longer than an equivalent incandescent light source. For at least the foregoing reasons, fluorescent lighting fixtures are popular choices for many lighting applications.

One conventional fluorescent lighting system is shown in FIG. 1. The illustrated fluorescent lighting system 100 is generally installed within an aircraft cabin to provide ambient illumination for aircraft passengers and crew. The system 100 includes at least one fluorescent lamp, at least one lamp control module (also known in the art as a power protection unit or PPU) and an inverter module. The inverter module 120 is connected to a DC power source in the aircraft to receive at its input a DC power (i.e., voltage and current). The inverter module 120 converts the DC power to an AC power, and outputs AC voltage and current to a lighting power bus 140. The inverter module 120 may also be connected to an input device such as a switch, cabin control unit, etc. in the aircraft (e.g., at a flight attendant station or in the cockpit) that may be operated/actuated by an aircraft crew member to output a dimming signal. Upon receiving the dimming signal (e.g., a momentary switch to ground signal), the inverter module 120 may vary the AC voltage and/or current at its output to dim or brighten the illumination intensity from the at least one fluorescent lamp.

As further shown in FIG. 1, the system 100 includes at least one PPU 160 and at least one fluorescent lamp 180 connected to each lamp control module 160. Although six PPUs 160 are shown with a total of twelve fluorescent lamps 180 connected thereto (the PPUs 160 and lamps 180 defining six areas or zones), the system could be configured otherwise. For example, fewer or additional lamps 180 and/or fewer or additional PPUs 160 may be provided relative to, for example, the configuration and/or number of inverter modules 120. As shown, the PPUs 160 are electrically connected to the bus 140 in a parallel configuration. Each PPU 160 receives AC power from the bus 140 and converts the AC input power to an appropriate AC output voltage and/or frequency to operate the one or more fluorescent lamps 180 connected thereto. The PPU 160 may include ballast-type circuitry for starting the fluorescent lamps 180, maintaining illumination thereof and protecting the system 100 and the lamps 180 in the event of a malfunction such as open or short circuits, broken output wires, improperly installed lamp connector assemblies, arcing, broken lamps or overheated lamp connectors/ends which occur as a lamp nears the conclusion of its life.

Although fluorescent lighting systems are more energy efficient than comparable incandescent lighting systems, fluorescent lighting systems that are installed in aircraft passenger cabins (e.g., the foregoing-described system 100 that is shown in FIG. 1) present aircraft operators with a number of challenges in operating and maintaining the systems. One challenge is that fluorescent systems employ glass lamps/bulbs that are subject to breakage, and therefore, are often difficult and/or time-consuming to replace safely. Furthermore, fluorescent bulbs use high voltage AC power (e.g., 1000Vp-p) and sometimes have a short service life (e.g., approximately 9000 hours) that requires airline operators to periodically inspect, maintain and replace bulbs that have failed or are near the end of their useful lives. Additionally, fluorescent bulbs emit ultra violet (UV) light that may cause plastic parts adjacent the bulb to become embrittled and/or break down over time. For example, UV light is known to affect exposed lamp connectors which may cause them to fail and result in a short circuit/arcing condition. Moreover, lamp control modules (i.e., ballast-like devices) of fluorescent systems often emit electromagnetic interference (EMI) which may interfere with other aircraft systems. Finally, fluorescent bulb systems are difficult to dim and illumination intensity is not typically customizable to a variety of levels. Conventional fluorescent systems are not continuously variable in their output illumination intensity and are instead generally constrained to discrete dimming levels (e.g., full brightness, off, and a brightness level intermediate off and full brightness). Additionally, when fluorescent bulbs/lamps are operated at dimmed illumination intensity (i.e., not full brightness), the useful life of the bulb/lamp is degraded/shortened.

In view of the foregoing-described challenges, it is desirable for airline operators to replace fluorescent-based lighting systems with light emitting diode (LED) based systems. However, existing replacement processes require aircraft operators to: 1) take an aircraft out of service for an extended period; access AC wiring and lighting system components (i.e., lamps and modules); and 2) replace existing AC wiring and lighting system components. At an average cost of $35M to have the aircraft on the ground to replace a fluorescent system with an LED based lighting system, it can be appreciated that existing replacement processes have significant drawbacks. In view of the foregoing, a new LED lighting system for an aircraft cabin that retrofits fluorescent lighting systems would be an important improvement in the art.

BRIEF DESCRIPTION OF THE DRAWINGS

FIG. 7 illustrates a second embodiment of an example lighting unit that may be employed in the system of FIG. 2;

FIG. 8 illustrates a third embodiment of an example lighting unit that may be employed in the system of FIG. 2;

DETAILED DESCRIPTION

Turning now to the Figures, a light emitting diode (LED) lighting system is provided. Although the present LED lighting system is described with respect to retrofitting a conventional fluorescent lighting system that illuminates a passenger cabin of an aircraft, the present system is not limited as such and may be employed in other environments in which fluorescent lighting systems are configured. For example, the present LED lighting system may be configured and employed to retrofit fluorescent lighting in other passenger vehicles including busses, vans, cars, trains and boats. Indeed, the present LED lighting system may be configured and employed to retrofit other conventional fluorescent lighting systems known in the art that illuminate spaces such as the interiors of residences, offices, etc. as well as fluorescent-based architectural lighting systems that illuminate the exteriors of such spaces.

Figure 1:
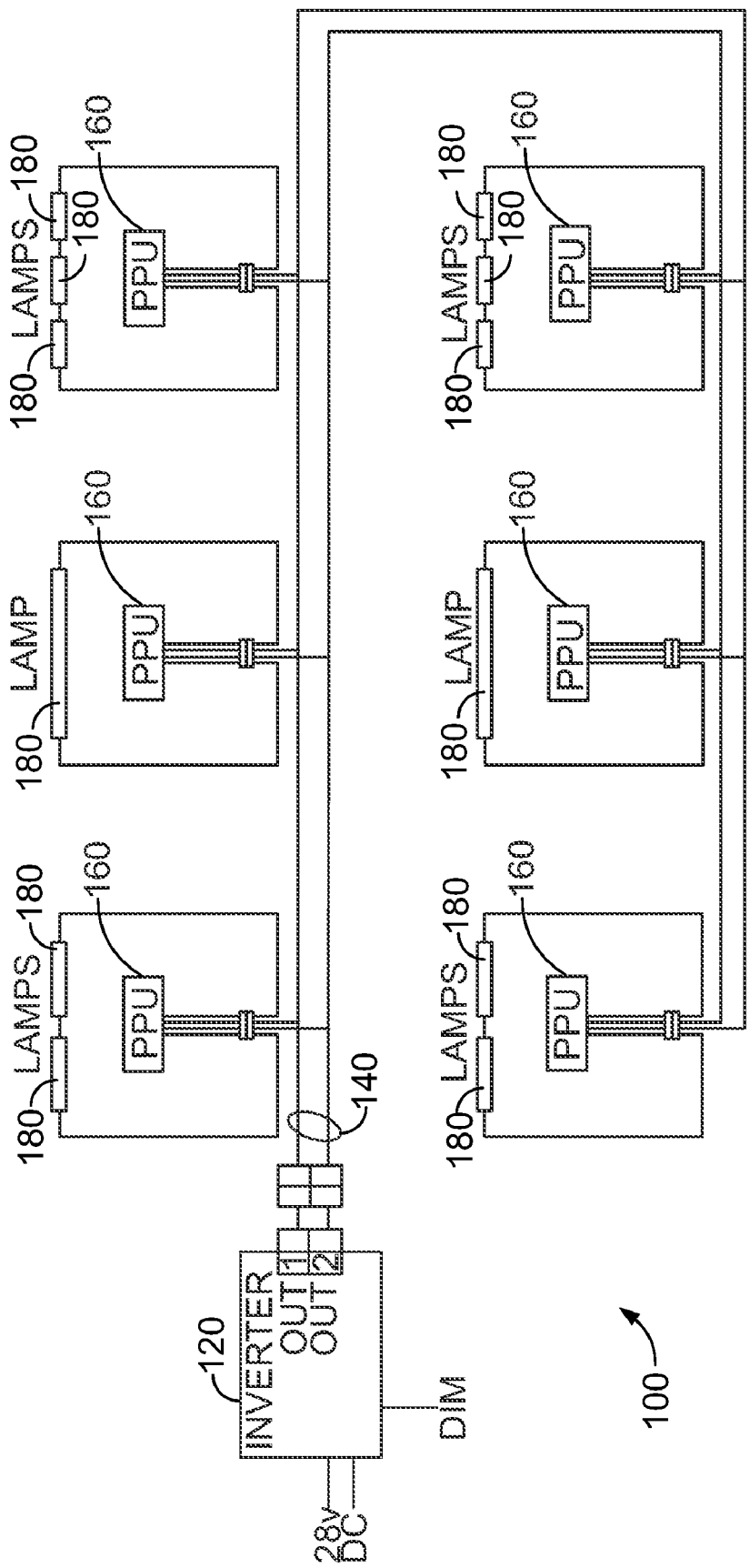
FIG. 1 illustrates an example conventional fluorescent lighting system for illuminating an aircraft cabin.
Figure 2:
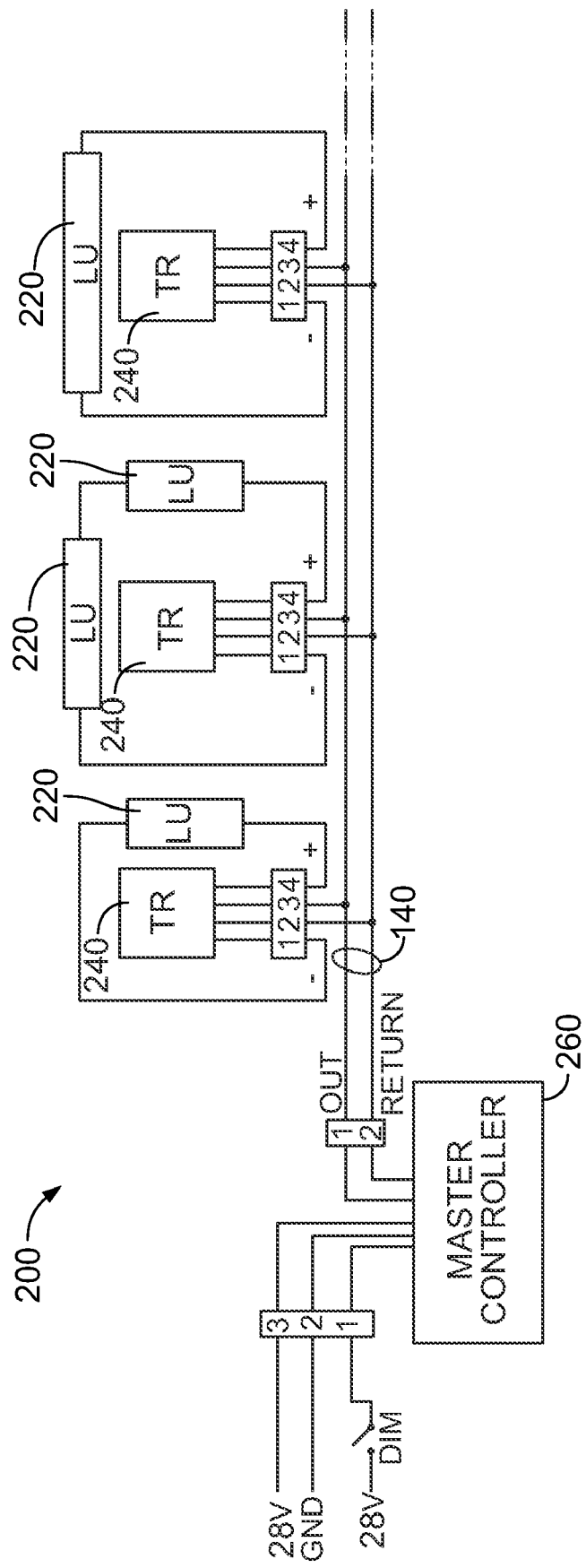
FIG. 2 illustrates a block diagram of an example LED lighting system that is configured to retrofit the conventional fluorescent lighting system of FIG. 1.

Turning now to FIG. 2, an example LED lighting system 200 in accordance with the invention is shown. As shown, the LED lighting system 200 includes at least one lighting unit (also referred to herein as LU) 220, at least one lighting unit (LU) control module 240, and, optionally, a master controller module 260. As can be appreciated from comparing FIGS. 1 and 2, the various components of system 200 are configured to directly replace, in situ, the various components of system 100 (e.g., the inverter module 120, the at least one PPU 160, and the at least one fluorescent lamp 180) without making substantial modifications to existing conditions of the aircraft cabin environment. That is, for example wiring, component mounting brackets, spaces in the aircraft such as behind passenger service panels, etc. need not be modified to upgrade system 100 to the LED lighting system 200. As can be appreciated from FIGS. 1 and 2, the lighting bus 140 of system 100, which provided AC power relative to system 100, is retained substantially intact during the retrofit process without rewiring, adding additional wiring or removing unused wiring. Accordingly, the lighting bus 140 is reused in system 200 to provide DC power to the at least one LU control module 240 and LU 220.

The at least one LU 220 is provided to replace the at least one fluorescent lamp 180 of system 100. That is, the at least one LU 220 is configured as a plug-and-play type module that replaces the at least one fluorescent lamp 180 of system 100. Depending on the configuration of the at least one fluorescent lamp 180, the at least one LU 220 may be configured as a 1:1 replacement (i.e., each fluorescent lamp 180 is replaced by a similarly sized LU 220). However, of course, one LU 220 may replace more than one fluorescent lamp 180. Similarly, the at least one LU control module 240 is configured to replace the at least one PPU 160 of system 100. Depending on the configuration of the at least one PPU 160, the at least one LU control module 240 may be configured as a 1:1 replacement (i.e., each PPU 160 is replaced by a LU control module 240). However, of course, one LU control module 240 may replace more than one PPU 160. Moreover, when the system 200 includes the optional master controller module 260, the master controller module 260 is configured to replace the at least one inverter module 120 of system 100. However, since DC to AC power conversion is not required for system 200, of course, one master controller module 260 may replace more than one inverter module 120.

As shown, when the system 200 includes the optional master controller module 260, the optional master controller module 260 is connected to a DC power source in the aircraft to receive at its input a DC power (i.e., voltage and current). The optional master controller module 260 is further connected at its output to the lighting power bus 140 so that the optional master controller module 260 may communicate with and provide power to the at least one LU control module 240. When the system 200 is provided with the optional master controller module 260, the module 260 may communicate with the at least one LU control module 240 (e.g., a plurality of modules 240 as shown in FIG. 2) over the two-wire power bus (e.g., communication over wire) to provide control/coordination for: dimming of the LUs 220; component and system diagnostics; efficiency monitoring; troubleshooting, etc. As further illustrated in FIG. 2, the optional master controller 260 may also be connected to an input device such as a switch, cabin control unit, etc. in the aircraft (e.g., at a flight attendant station or in the cockpit) that may be operated/actuated by an aircraft crew member to output a dimming signal "DIM." Upon receiving the dimming signal (e.g., a momentary switch to ground signal), the optional master controller module 260 may output a signal to the bus 140 for coordinating operation of LU control modules 240 to provide simultaneous or selective dimming of one or more of the LUs 220. As will be described and shown hereinafter, the optional master controller module 260 includes a control unit (e.g., a microprocessor, microcontroller, digital signal processor, field programmable gate array, etc.) so that the master controller module 260 may be configured or programmed with various supervisory-type control and communications algorithms/firmware that provide functionality, controllability and customization that were previously generally unavailable in fluorescent-based lighting systems (e.g., system 100).

In some embodiments of the system, each LU control module 240 may have a unique address or identifier and be configured to control one or more (e.g., grouped) LUs 220 so that the optional master controller module 260 may selectively control lighting intensity in a zoned-manner. For example, one or more LU control modules 240 may be configured to control LUs 220 that illuminate a first-class portion of the cabin. In this example, lighting in the first-class portion of the cabin may be selectively dimmed to a desired illumination intensity level by the master controller module 260 while the remainder of the cabin (e.g., an economy-class section) remains at a full brightness level or is dimmed to another illumination intensity level. In embodiments of the system 200 that do not include the optional master controller module 260, an input device such as a switch, cabin control unit, etc. in the aircraft (e.g., at a flight attendant station or in the cockpit) that may be operated/actuated by an aircraft crew member to output a dimming signal (e.g., a momentary switch to ground signal) may be in direct communication with the bus 140. In this way, the individual LU control modules 240 may substantially simultaneously receive the dimming signal over the two-wire power bus 140 (i.e., communication over wire) such that substantially all of the LUs 220 in communication with the bus 140 are dimmed or brightened substantially simultaneously.

As further shown in FIG. 2, the system 200 includes at least one LU control module 240 (e.g., three as shown) and at least one LU 220 (e.g., four as shown) connected to the bus 140 and in communication with the optional master controller module 260. Although three LU control modules 240 are shown to be controlling/in communication with a total of four LUs 220, the system 200 could be configured otherwise (e.g., with fewer or additional LUs 220, fewer or additional LU control modules 240, and/or fewer or additional LUs 220 per each LU control module 240). As can be appreciated each LU control module 240 and its associated at least one LU 220 define LED lighting subsystems that can be configured to provide illumination to an area or zone. As shown, the LU control modules 240 are electrically connected to the bus 140 in a parallel configuration. Each LU control module 240 at its input receives control signals and DC power from the bus 140. Furthermore, each LU control module 240 is electrically connected to one or more LUs 220 to control illumination thereof.

As will be described and shown hereinafter, each LU control module 240 includes a control unit (e.g., a microprocessor, microcontroller, digital signal processor, field programmable gate array, etc.). In an embodiment, LU control modules 240 are configured as switch mode, constant current modules so that uniform current is output from the modules 240 to each one or more LED of the LUs 220. In this way, no substantial bright or dim spots appear in the LUs 220 regardless of the quantity of LEDs per LU 220 and regardless if there is one or more LUs 220 electrically connected to each module 240. Furthermore, with this switch mode, constant current configuration, switching noise and EMI are substantially contained within the module 240 such that other system components are substantially isolated. As can be appreciated, each LU control module 240 may be configured or programmed with various control and communications algorithms/firmware that provide distributed, ad hoc, peer-to-peer type functionality, controllability and customization that were previously generally unavailable in fluorescent-based lighting systems (e.g., system 100). Some examples of programmed functionality include:

A. The LU control module 240 may be programmed/configured with output power settings for adjustable brightness control of one or more LUs 220 connected thereto. By setting the LU control modules 240 with a maximum current draw or output, the system 200 can be configured to conform to a desired power budget. Furthermore, the LU control modules 240 may be programmed or set to provide one or more discrete dim levels or continuously/infinitely variable dimming. Although various light intensity levels can be preset at installation time, the LU control modules 240 may be fine tuned, reprogrammed, changed as desired to conform to various requirements of the cabin crew or aircraft operator.

B. The LU control modules 240 may be configured or programmed to provide soft start and soft dimming, color temperature change, etc. For example, when powering-up or energizing the LUs 220, rather than the normal overshoot and flickering that fluorescent lamps produce, the LU control module 240 may smoothly ramp up power (e.g., voltage and/or current) to the LUs 220 to the required brightness so that turn on transients that tax the power supply are eliminated or substantially minimized. Similarly, when LU control modules 240 receive a signal from the bus 140 to dim the LUs 220, the LU control module 240 may ramp down power to the LUs 220 such that dimming is smooth and gradual instead of stepwise/incremental.

C. In cooperation with one or more sensors in the system 200, the LU control module 240 may be programmed or configured with algorithms/firmware that facilitate on-board diagnostics and enable the system to identify and track errors, malfunctions or other fault conditions including, for example: open load conditions, output over-voltage conditions, short circuits, critical failures, LU 220 or module 240 over-temperature, inductor saturation, reverse polarity, input over-voltage, input under-voltage protection. All errors, failures or other fault conditions may be tracked and recorded/logged for subsequent analysis/diagnosis to facilitate repair/replacement of one or more components. Furthermore, the LU control module 240 may be programmed or configured with algorithms/firmware that facilitate efficiency monitoring. Modules 240 may continuously, periodically or randomly check system power usage to determine if the measured/sensed or otherwise determined efficiency matches with a specified efficiency. If it does not, an indication (e.g., a warning light or sound) may be provided to a cabin crew member and/or a diagnostic message may be stored for later analysis. Moreover, if measured/sensed efficiency is critically low, one or more of the LU control modules 240 may shut down or enter a sleep mode to protect the system 200 and itself from overheating or other failures.

Figure 3:
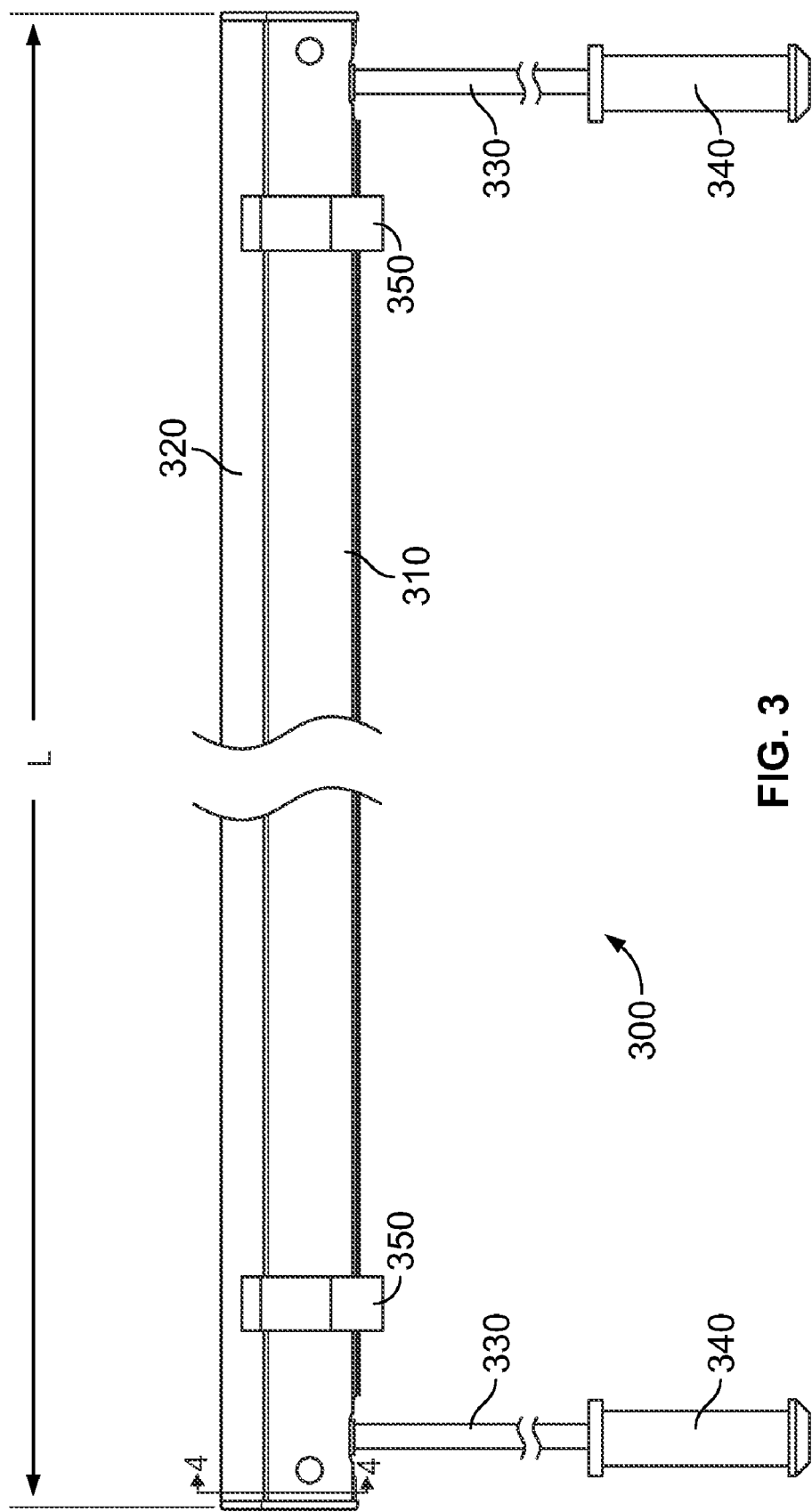
FIG. 3 illustrates a first embodiment of an example lighting unit that may be employed in the system of FIG. 2.

Turning now to FIGS. 3-8 various embodiments of the LU 220 of FIG. 2 will now be described. As shown in FIG. 3, a first example embodiment of an example lighting unit (LU) 220 of FIG. 2 is generally elongated and cylindrical in shape to replace the fluorescent lamp 180 (FIG. 1). As shown, the first example LU 300 has a length "L" for replacing one or more fluorescent lamps 180. Length L may correspond to various known lengths of fluorescent lamps 180 (e.g., about 150 mm to about 1320 mm) or any desired lengths to facilitate replacing the one or more fluorescent lamps 180. The first example LU 300 includes a housing portion 310, a lens portion 320 coupled with the housing portion 310, input and output cables/wires 330 and connectors 340 coupled with each of the input and output cables/wires 330. As shown, the first example LU 300 may optionally include one or more coupling devices 350 (e.g., mounting brackets) to mount the LU 300 to a designated location or locations. However, the coupling device 350 may have already been pre-installed in the designated location or locations to support the fluorescent lamps 180 and, therefore, may be reused to mount the LU 300.

The housing portion 310 may be made of various suitable materials, for example plastic, metal (e.g., aluminum alloy), etc. and is configured to support internal components (e.g., circuit board, LEDs, etc.) that will be described hereinafter. The lens portion 320 may be made of various suitable materials, for example plastic, glass, polycarbonate, etc. and is substantially transparent or translucent. The lens portion 320 may focus, diffuse, colorize, etc light that is emitted from the LEDs in the housing portion 310. Furthermore, the lens portion 320 may be removably coupled (e.g., slidably, snap-in, etc.) with the housing portion 310 to facilitate access to internal components for repair, replacement, etc. as well as, for example, exchanging an uncolorized lens portions 320 for a colorized one. The wires 330 and connectors 340 may be any suitable wires (e.g., 20 AWG) and connectors (e.g., AMP 350636-7, 350550-7) to couple the LU 300 with the LU control module 240 (FIG. 2).

Figure 4:
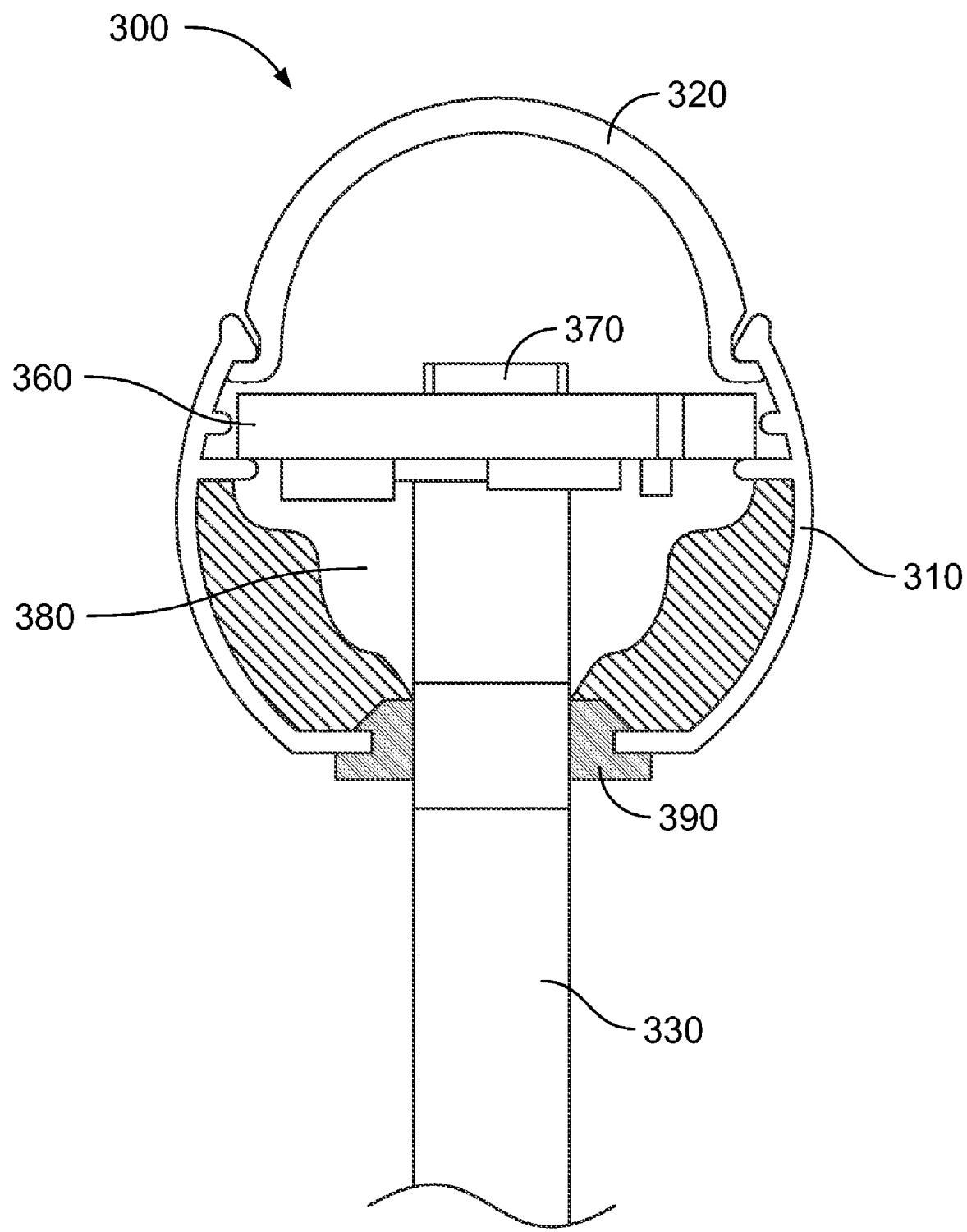
FIG. 4 illustrates a sectional view of the first embodiment shown in FIG. 3.

FIG. 4 shows a sectional view of the first example LU 300 along section line 4-4 of FIG. 3. As shown in FIG. 4, the first example LU 300 further includes a circuit board 360 (e.g., a printed circuit board) and at least one light emitting diode 370 (LED) that is mounted to the circuit board 360. The circuit board 360 may be secured to the housing portion 310 by any suitable means known in the art (e.g., with adhesive, a mechanical fastener, etc.). As shown, the circuit board 360 is secured to the housing portion 310 with an adhesive 380 that also provides strain relief to the input and output cables/wires 330. A grommet 390 may be provided to substantially seal the housing portion 310. As can be appreciated, the circuit board 360 may be further secured by disposing the board 360 on an internal lip/ridge or shelf within the housing portion 310 and sandwiching the board 360 between the internal shelf and the lens portion 320. The at least one LED 370 is in electrical connection with the input and output cables/wires 330 to receive DC voltage and current so that the at least one LED 370 may emit light. Although only one LED 370 is shown in FIG. 4, indeed, additional LEDs 370 (e.g., a plurality of LEDs) may be mounted to the circuit board 360 to achieve a desired light output intensity, color temperature and color rendering index. For example, the at least one LED 370 may be configured in LU 300 to substantially match the light output of the fluorescent lamp 180 being replaced (e.g., about 1450 lumens with a color temperature in the range of about 3500K to about 4500K, and a color rendering index in the range of about 60 to about 85). Alternatively, the at least one LED 370 may be configured in LU 300 to provide a desired light output from the first example LU 300.

Figure 5:
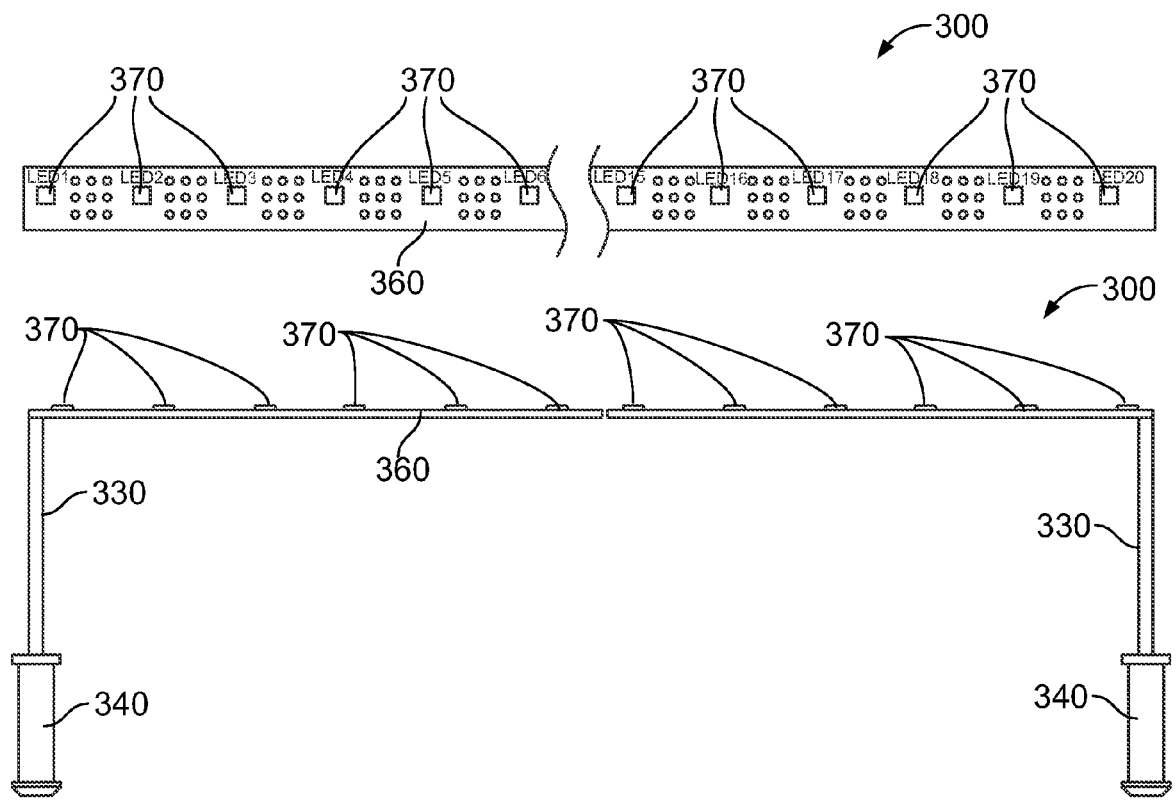
FIG. 5 illustrates a plan and elevation views of internal components of the first embodiment shown in FIG. 3.
Figure 6:
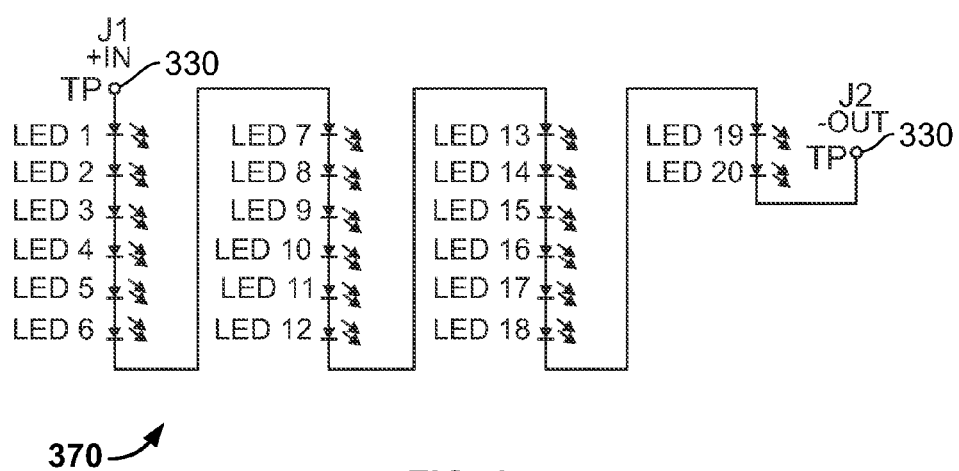
FIG. 6 is an example schematic diagram of the first embodiment shown in FIG. 3.

FIG. 5 shows a top plan view and an elevation view of an example configuration of circuit board 360 and the at least one LED 370 mounted thereon of the LU 300 of FIGS. 3 and 4. FIG. 6 shows an example schematic diagram for the LU 300. As can be appreciated from FIG. 5, the at least one LED 370 (e.g., a plurality of LEDs) may be spaced substantially equally along the length L (FIG. 3) of the LU 300. Although FIG. 5 shows twelve LEDs 370, of course fewer or additional LEDs 370 may be provided. For example, as shown in FIG. 6, the at least one LED 370 may be an array of twenty LEDs connected in series between the input and output cables/wires. As can be appreciated, the at least one LED 370 may be a white, surface-mount LED or any other suitable LED known in the art. Some suitable LEDs 370 are available from Nichia, Cree and Lumileds as well as other suppliers and manufacturers.

As mentioned above, the LU 220 may be configured in various lengths as desired. To this end, FIG. 7 shows a second example embodiment of the lighting unit (LU) 220 of FIG. 2 and FIG. 8 shows a third example embodiment of the lighting unit (LU) 220 of FIG. 2. Similar to the first example LU 300, the second example LU 400 is generally elongated and cylindrical in shape to replace the fluorescent lamp 180 (FIG. 1). The second example LU 400 includes a housing portion 410, a lens portion 420 coupled with the housing portion 410, input and output cables/wires 430 and connectors 440 coupled with each of the input and output cables/wires 430. As can be appreciated by comparing FIGS. 3 and 7, the second example LU 400 may be configured to be generally longer than the length L of the first example LU 300. As shown, the longer length second example LU 400 may be provided by coupling together a number of circuit boards 460, which may be the same length, shorter or longer than circuit board 360 (FIG. 5). For example, circuit boards may be fabricated in one or more predetermined lengths to provide a plurality of LUs 220. A spacer 405 and a jumper 415 may be provided to physically and electrically connect the multiple circuit boards 460. In this way, the second example LU 400 may be configured to replace one long fluorescent lamp 180, more than one fluorescent lamp 180, or fluorescent lamps 180 that may be non-linear in shape. Although two circuit boards 460 are coupled together as shown in FIG. 7, indeed, additional circuit boards may be coupled together to provide an LU having a desired length. For example, as shown in FIG. 8, a third example embodiment of the lighting unit (LU) 220 of FIG. 2 is provided in which the third example LU 500 includes a housing portion 510, a lens portion 520 coupled with the housing portion 510, input and output cables/wires 530, connectors 540 coupled with each of the input and output cables/wires 530, three circuit boards 560, and two spacers 505 and two jumpers 515. As shown, the even longer length third example LU 500 may be provided by coupling together a number of circuit boards 560, which may be the same length, shorter or longer than circuit board 360 and/or circuit board 460. Spacers 505 and jumpers 515 may be provided to physically and electrically connect the multiple circuit boards 560.

Figure 9:
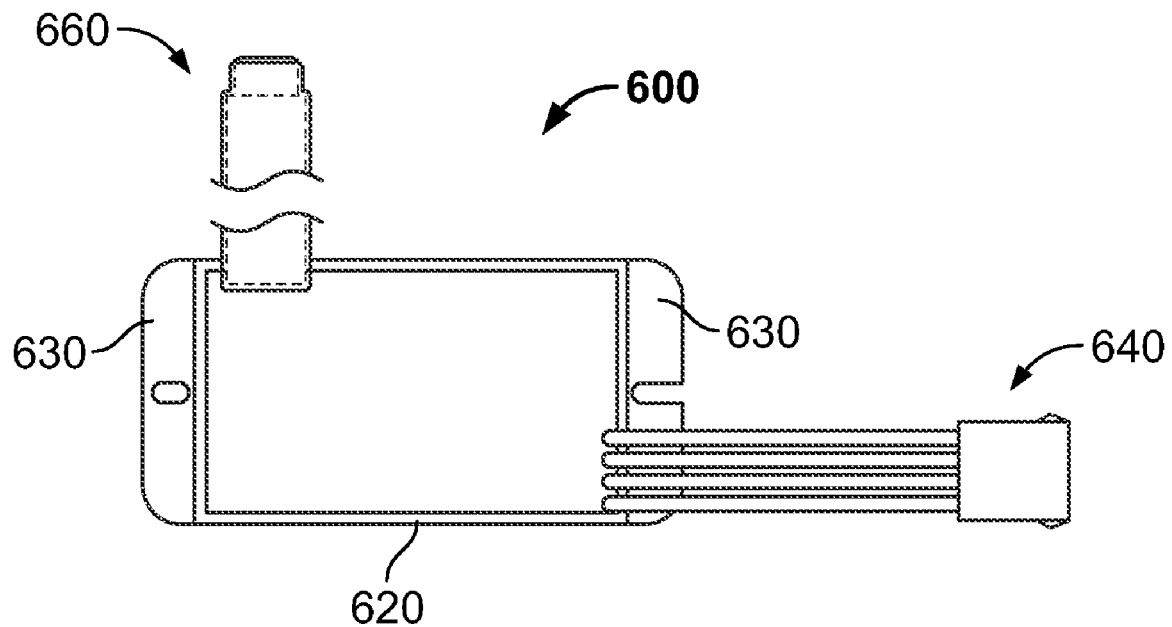
FIG. 9 illustrates a plan view of an example lighting unit control module of the system of FIG. 2.
Figure 10:
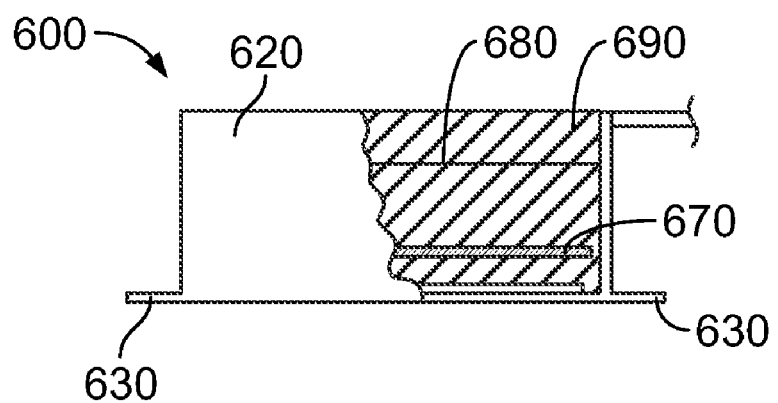
FIG. 10 illustrates a partial cut-away, elevation view of the lighting unit control module of FIG. 9.
Figure 11:
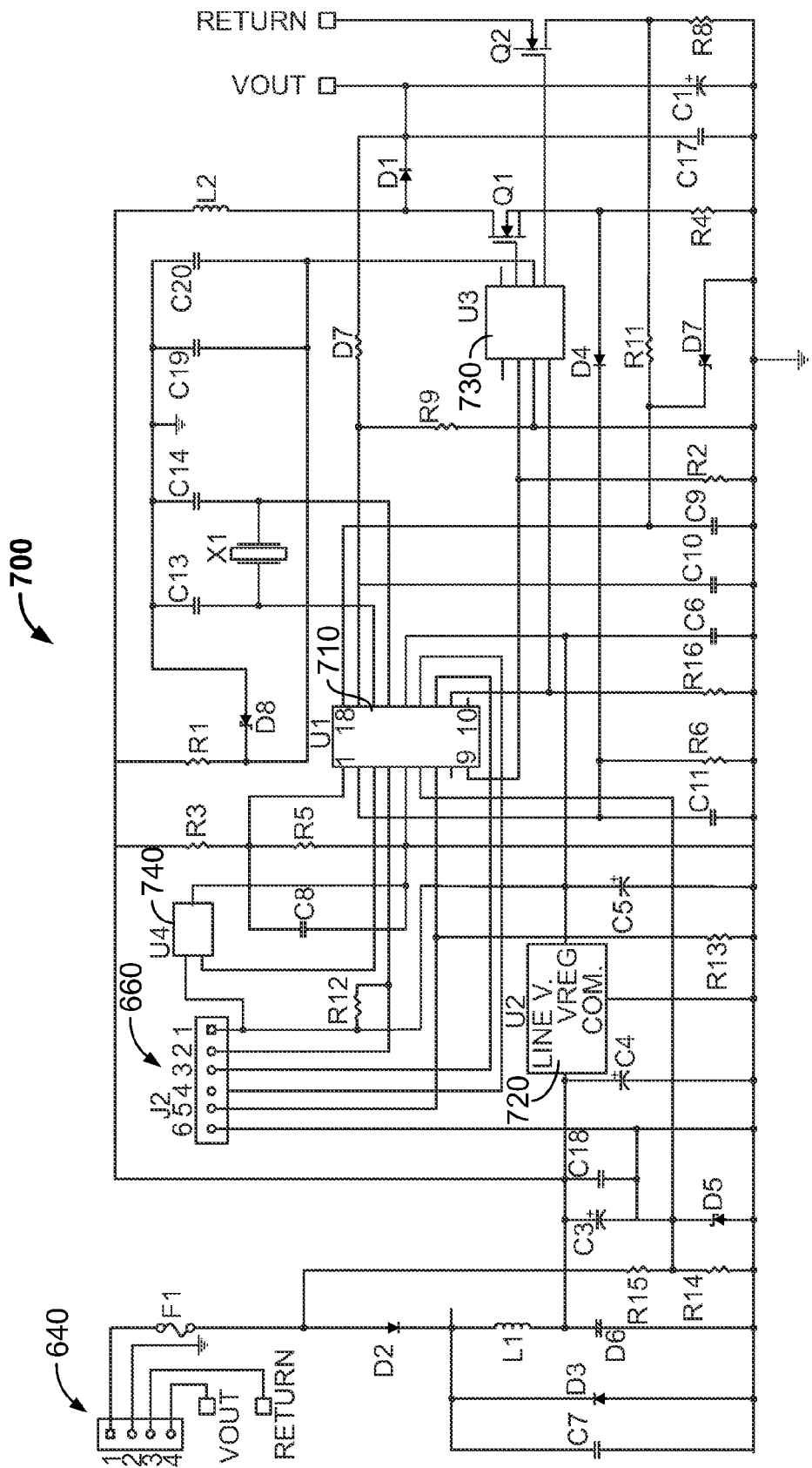
FIG. 11 is an example schematic diagram of the lighting unit control module of FIG. 9.

Turning now to FIGS. 9-11, an example embodiment of the LU control module 240 of FIG. 2 is described. As shown in FIG. 9, the example LU control module 600 includes a generally compact, parallelepiped-shaped housing 620, mounting flanges 630, an input/output connector 640, and, optionally, a test port/connector 660. The housing 620 may be configured to have substantially the same physical characteristics (e.g., dimensions and weight) as a PPU 160 (FIG. 1) for facilitating direct replacement thereof. One PPU 160 that is known in the art weighs about 4.9 oz and has the dimensions of about 5.7"×3.4"×1.8" (length×width×height) such that the housing 620 has the dimensions of about 5.7"×3.4"×1.8" and the module 600 weighs about 6.3 oz. Although mounting flanges 630 are provided for mounting the module 600 to a surface or other object, the module 600 may be mounted otherwise, for example with adhesive or other fasteners (e.g., screws, bolts, clamps, etc.) known in the art. The input/output connector 640 as shown includes four wires/cables. Referring briefly to FIG. 2, it can be understood that two wires/cables of the connector 640 provide a DC supply and return to power and control the LU 220 and the other two wires/cables of the connector 640 are used to interface the module 600 with the bus 140 (and optionally the master controller module 260 of FIG. 2). The connector 640 may be configured with various wires/cables and connectors known in the art to facilitate interconnecting the module 600 with existing wiring (e.g., bus 140) and/or connectors of system 100 (FIG. 1). For example, connector 640 may include 20 AWG wires, and AMP 1-480703-0 connector and AMP 350536-7 terminal. However, the connector 640 is not limited thereto. The optional test port/connector 660 may be provided to interface a computer (e.g., laptop, PDA, etc.) or other suitable device to the module 600. In this way, the module 600 may be tested, programmed (e.g., firmware may be installed, upgraded, and/or debugged), faults diagnosed, etc.

As shown in FIG. 10, the example LU control module 600 includes, within the housing 620, a circuit board 670 (with various electrical and electronic components thereon that cooperate for lighting control and/or communication), a shield 680 (e.g., for EMI isolation), and an insulator 690 such as potting compound (e.g., Insulcast 333, or the like). Referring now to FIG. 11, a schematic diagram is provided for the example LU control module 600. In the schematic, an example circuit 700 in which the various electrical and electronic components (and the interconnections thereof) of circuit board 670 are illustrated. As shown in FIG. 11, the circuit 700 includes a number of integrated circuit (IC) chips including a processor 710 (e.g., a PIC 16F88 microcontroller), a voltage regulator 720 (e.g., MC78L05ABDR2), a gate driver 730 (e.g., IR4427S), and a temperature sensor 740 (e.g., LM50CIM3). The circuit 700 also includes a plurality of resistors, capacitors, inductors, diodes, switches (e.g., MOSFETS) etc. as shown, which together with the foregoing components 710-740, provide LED-driving circuitry to power and control illumination of the at least one LU 220 (FIG. 2). The circuit 700 shown in FIG. 11 is one example circuit for module 600 and LU control module 240. However, it should be appreciated that the components and the configuration/interconnection of components shown in FIG. 11 is in no way limiting to the present system 200.

Figure 12:
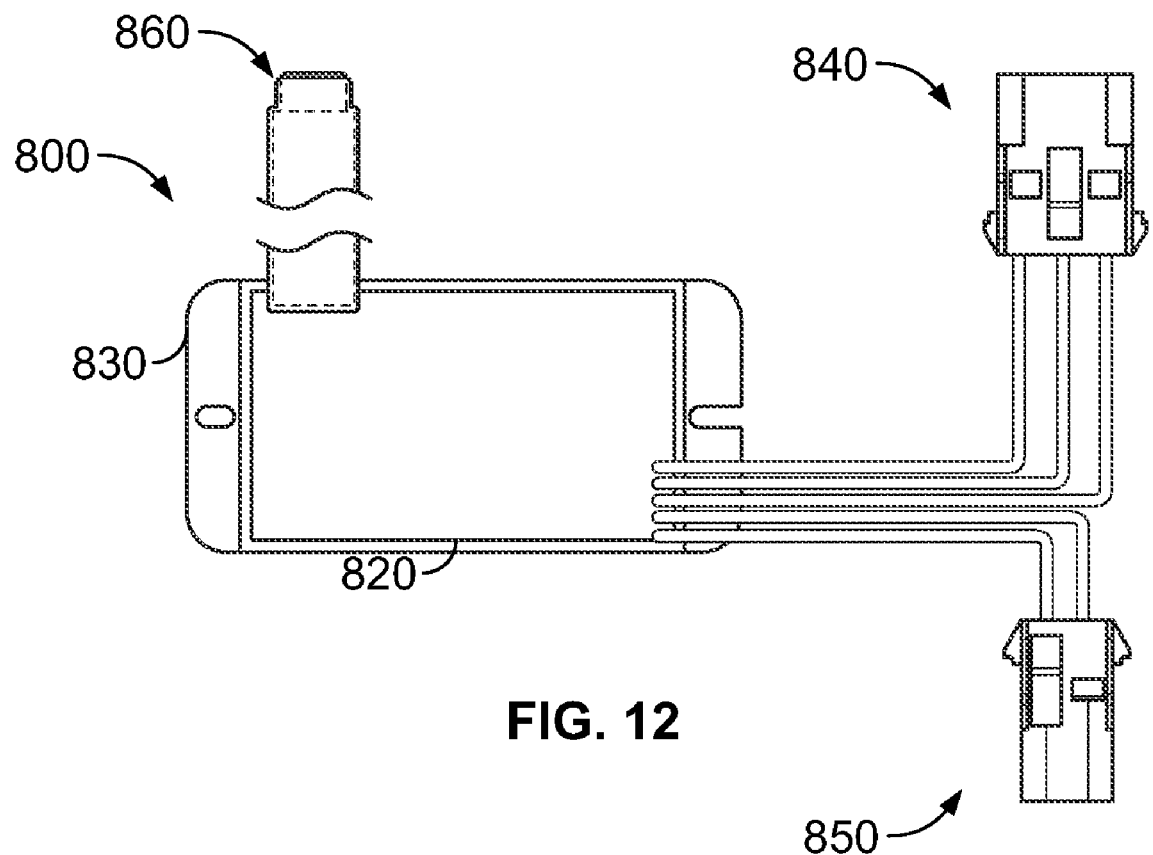
FIG. 12 illustrates a plan view of an example master controller module of the system of FIG. 2.
Figure 13:
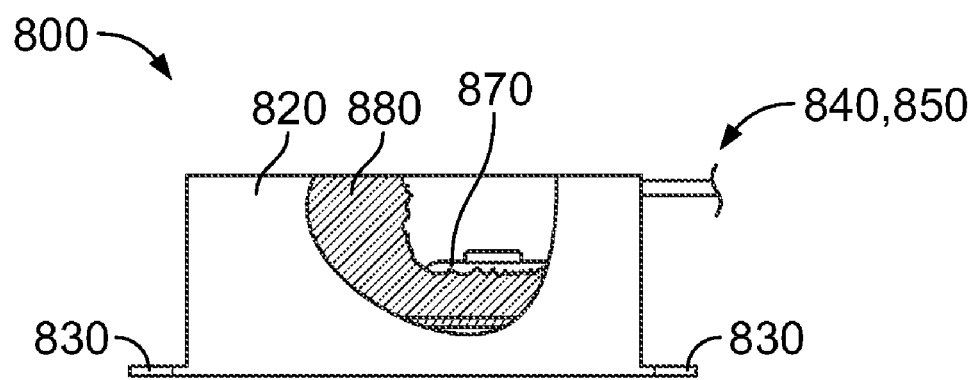
FIG. 13 illustrates a partial cut-away, elevation view of the master controller module of FIG. 12.
Figure 14:
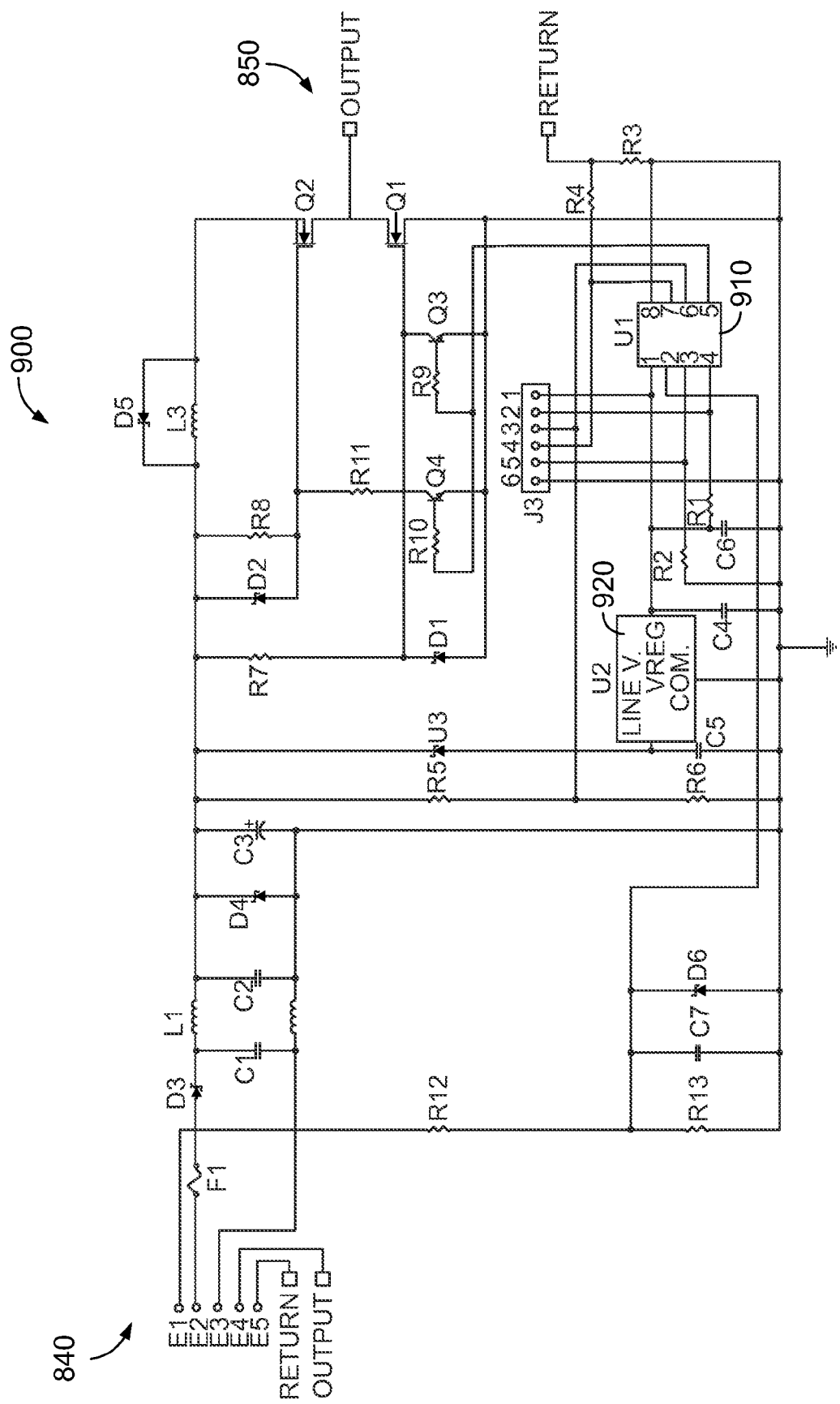
FIG. 14 is an example schematic diagram of the master controller module of FIG. 12.

Turning now to FIGS. 12-14, an example embodiment of the optional master controller module 260 of FIG. 2 is described. By comparing FIGS. 12 and 13 with FIGS. 9 and 10, it can be appreciated that the LU control module 240 and master controller module 260 may be similar in many respects. As shown in FIG. 12, the example master controller module 800 includes a generally compact, parallelepiped-shaped housing 820, mounting flanges 830, an input connector 840, an output connector 850, and, optionally, a test port/connector 860. The housing 820 may be configured to have substantially the same physical characteristics (e.g., dimensions and weight) as an inverter module 120 (FIG. 1) for facilitating direct replacement thereof. One inverter module 120 that is known in the art weighs about 17 oz and has the dimensions of about 5.7"×3.4"×1.8" (length×width×height) such that the housing 820 has the dimensions of about 3.4"× 1.7"×1.2" and the module 800 weighs about 6.3 oz. Although mounting flanges 830 are provided for mounting the module 800 to a surface or other object, the module 800 may be mounted otherwise, for example with adhesive or other fasteners (e.g., screws, bolts, clamps, etc.) known in the art.

The input connector 840 as shown includes three wires/cables. Referring briefly to FIG. 2, it can be understood that two wires/cables of the connector 840 are for interfacing the module 800 with the DC power supply (e.g., 28V DC and ground/return) and the other wire/cable of the input connector 840 is used to interface the module 800 with an input device such as a switch, cabin control unit, etc. in the aircraft (e.g., at a flight attendant station or in the cockpit) that may be operated/actuated by an aircraft crew member for receiving a dimming output signal therefrom (e.g., "DIM", FIG. 2). The output connector 850 as shown includes two wires/cables. Referring briefly to FIG. 2, it can be understood that the two wires/cables of the connector 850 are for interfacing the module 800 with the bus 140 for communicating with the at least one LU control module 240 of FIG. 2. The connectors 840, 850 may be configured with various wires/cables and connectors known in the art to facilitate interconnecting the module 800 with existing wiring (e.g., bus 140) and/or connectors of system 100 (FIG. 1). For example, connector 840 may include 20 AWG wires, AMP 1-480701-0 connector with AMP 350550-1 terminals, whereas connector 850 may include 20 AWG wires, AMP 1-480699-0 connector with AMP 350550-1 terminals. However, the connectors 840, 850 are not limited thereto. The optional test port/connector 860 may be substantially similar to the optional test port/connector 660 of module 600. To this end, the optional test port/connector 860 is provided to interface a computer (e.g., laptop, PDA, etc.) or other suitable device to the module 800. In this way, the module 800 may be tested, programmed (e.g., firmware may be installed, upgraded, and/or debugged), faults diagnosed, etc. Furthermore, by interfacing a suitable device to the module 800, the at least one LU control modules 240 (e.g., module 600) may be programmed, tested, diagnosed, etc.

As shown in FIG. 13, the example optional master controller module 800 includes, within the housing 820, a circuit board 870 (with various electrical and electronic components thereon that cooperate for lighting control and/or communication), and an insulator 880 such as potting compound (e.g., Insulcast 333, or the like). Referring now to FIG. 14, a schematic diagram is provided for the example master controller module 800. In the schematic, an example circuit 900 in which the various electrical and electronic components (and the interconnections thereof) of circuit board 870 are illustrated. As shown in FIG. 14, the circuit 900 includes a number of integrated circuit (IC) chips including a processor 910 (e.g., a PIC 12F675 microcontroller) and a voltage regulator 920 (e.g., MC78L05ABDR2). The circuit 800 also includes a plurality of resistors, capacitors, inductors, diodes, switches (e.g., MOSFETS) etc. as shown to provide power to bus 140 and communicate with the at least one LU control module 240 for controlling illumination of the at least one LU 220 (FIG. 2). Since the LU control module 240 interconnects or otherwise bridges the DC power supply and the bus 140 together as shown in FIG. 2, it can be appreciated that the circuit 900 may include a DC-DC converter or functionality thereof for adjusting or otherwise controlling voltage on the bus 140. The circuit 900 shown in FIG. 14 is one example circuit for module 800 and master controlling module 260. However, it should be appreciated that the components and configuration/interconnection of components shown in FIG. 14 is in no way limiting to the present system 200.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Various embodiments of this invention are described herein. It should be understood that the illustrated embodiments are exemplary only, and should not be taken as limiting the scope of the invention.

What is claimed is:

1. An LED lighting system for retrofitting a fluorescent lighting system including a DC power bus, an inverter connected to the DC power bus for outputting AC power to a lighting bus, a fluorescent light, and a ballast-type unit that receives the AC power from the lighting bus and controls illumination of the fluorescent light, the system comprising:
  an LED lighting unit for replacing, in situ, the fluorescent light, the LED lighting unit including a housing configured substantially similarly to a configuration of the fluorescent light, and at least one LED in the housing; and a control module for replacing, in situ, at least one of the inverter and the ballast-type unit, the control module electrically connected to the lighting bus and the LED lighting module for controlling illumination of the at least one LED;

wherein the LED lighting unit is configured to replace the fluorescent light and at least one additional fluorescent light adjacent to the fluorescent light, the LED lighting unit comprising:

first and second circuit boards on which the at least one LED are mounted, the first and second circuit boards being oriented end-to-end;

a nonconductive spacer for mechanically coupling an end of the first circuit board with an adjacent end of the second circuit board; and a jumper for electrically connecting LEDs mounted on the first circuit board with LEDs mounted on the second circuit board.

2. The system of claim 1 wherein the jumper bridges the nonconductive spacer.

3. An LED lighting system for retrofitting a fluorescent lighting system including a lighting bus, an inverter connected to a DC power bus for outputting AC power to the lighting bus, first and second fluorescent lights, and first and second ballast-type units that receive the AC power from the lighting bus and respectively control illumination of the first and second fluorescent lights, the system comprising:

a first LED lighting subsystem including a first LED lighting unit, and a first control module electrically connected to the lighting bus and the first LED lighting unit for controlling illumination of the first LED lighting unit, the first LED lighting unit replacing, in situ, the first fluorescent light, and the first control module replacing, in situ, the first ballast-type unit; and a second LED lighting subsystem including a second LED lighting unit, and a second control module electrically connected to the lighting bus and the second LED lighting unit for controlling illumination of the second LED lighting unit, the second LED lighting unit replacing, in situ, the second fluorescent light, and the second control module replacing, in situ, the second ballast-type unit;

wherein at least one of the first and second LED lighting unit is configured to further replace at least one additional fluorescent light, said at least one of the first and second LED lighting unit comprising:

first and second circuit boards on which a plurality of LEDs are mounted, the first and second circuit boards being oriented end-to-end;

a nonconductive spacer for mechanically coupling an end of the first circuit board with an adjacent end of the second circuit board; and a jumper for electrically connecting LEDs mounted on the first circuit board with LEDs mounted on the second circuit board.

4. The system of claim 3 wherein the jumper bridges the nonconductive spacer.

* * * * *